United States Patent
Haas et al.

(10) Patent No.: US 9,908,444 B2
(45) Date of Patent: Mar. 6, 2018

(54) CHILD SAFETY SEAT

(71) Applicant: BRITAX RÖMER KINDERSICHERHEIT GMBH, Ulm (DE)

(72) Inventors: Martin Haas, Steinheim (DE); Richard Frank, Elchingen (DE); Richard Henseler, Ulm (DE)

(73) Assignee: BRITAX RÖMER KINDERSICHERHEIT GMBH, Leipheim (DE)

( * ) Notice: Subject to any disclaimer, the term of this patent is extended or adjusted under 35 U.S.C. 154(b) by 0 days.

(21) Appl. No.: 14/904,271

(22) PCT Filed: Jul. 7, 2014

(86) PCT No.: PCT/EP2014/001859
§ 371 (c)(1),
(2) Date: Jan. 11, 2016

(87) PCT Pub. No.: WO2015/007372
PCT Pub. Date: Jan. 22, 2015

(65) Prior Publication Data
US 2016/0152164 A1 Jun. 2, 2016

(30) Foreign Application Priority Data
Jul. 16, 2013 (EP) .................................... 13003568

(51) Int. Cl.
*B60N 2/42* (2006.01)
*B60R 21/00* (2006.01)
(Continued)

(52) U.S. Cl.
CPC ......... *B60N 2/2884* (2013.01); *B60N 2/2866* (2013.01); *B60N 2/2872* (2013.01);
(Continued)

(58) Field of Classification Search
CPC .. B60N 2/2866; B60N 2/2872; B60N 2/4235; B60N 2/2884; B60N 2/2881;
(Continued)

(56) References Cited

U.S. PATENT DOCUMENTS 7,125,073 B2 * 10/2006 Yoshida ............... B60N 2/2812
297/216.11
7,232,182 B2 * 6/2007 Yoshida ............... B60N 2/2806
297/216.11
(Continued)

FOREIGN PATENT DOCUMENTS

CN 101954873 A 1/2011
CN 102741085 A 10/2012
(Continued)

OTHER PUBLICATIONS

International Search Report and Written Opinion of corresponding application No. PCT/EP2014/001859, dated Jul. 10, 2014, all enclosed pages cited.
(Continued)

*Primary Examiner* — Chi Q Nguyen
(74) *Attorney, Agent, or Firm* — McNair Law Firm, P.A.

(57) ABSTRACT

The child safety seat for a vehicle in accordance with the invention comprises an outer shell enclosing a seating area for a child and a protective element. The protective element comprises a housing component and an impact component, wherein the housing component is embedded into the outer shell and the impact component is mounted to the housing component, is configured to be enclosed at least partially by the housing component, and is configured to protrude laterally from the outer shell in a direction facing away from the seating area. Preferably, the housing component or the impact component comprises a deformable region adapted to cushion forces impacting on the impact component.

18 Claims, 4 Drawing Sheets

(51) Int. Cl.
*B60N 2/28* (2006.01)
*B60N 2/48* (2006.01)
*B60N 2/427* (2006.01)
*B60R 21/207* (2006.01)
*B60N 2/26* (2006.01)

(52) U.S. Cl.
CPC ............... *B60N 2/26* (2013.01); *B60N 2/286* (2013.01); *B60N 2/2851* (2013.01); *B60N 2/2881* (2013.01); *B60N 2/4228* (2013.01); *B60N 2/4235* (2013.01); *B60N 2/42709* (2013.01); *B60N 2/4885* (2013.01); *B60R 21/2072* (2013.01)

(58) Field of Classification Search
CPC .... B60N 2/2851; B60N 2/4228; B60N 2/286; B60N 2/4885; B60N 2/42709; B60N 2/26; B60R 21/2072
USPC .......... 297/216.11, 250.1, 219.12, 410, 396, 297/216.12
See application file for complete search history.

(56) References Cited

U.S. PATENT DOCUMENTS

| | | | | |
|---|---|---|---|---|
| 7,293,828 B2* | 11/2007 | Yoshida | ............... | B60N 2/2851 280/730.1 |
| 8,056,972 B2* | 11/2011 | Marsden | ............... | B60N 2/2884 297/216.1 |
| 8,096,613 B2* | 1/2012 | Gibson | ................ | B60N 2/2851 297/250.1 |
| 8,128,165 B2* | 3/2012 | Marsden | ............... | B60N 2/2851 297/216.1 |
| 9,211,820 B2* | 12/2015 | Allen | .................... | B60N 2/4235 |
| 2001/0043001 A1* | 11/2001 | Kassai | ................. | B60N 2/2821 297/250.1 |
| 2004/0169406 A1* | 9/2004 | Yoshida | ................ | B60N 2/2812 297/216.11 |
| 2004/0251721 A1* | 12/2004 | Yoshida | ................ | B60N 2/2851 297/250.1 |
| 2006/0038428 A1 | 2/2006 | Song | | |
| 2010/0026064 A1 | 2/2010 | Marsden et al. | | |
| 2010/0295346 A1* | 11/2010 | Marsden | ................ | B60N 2/2851 297/216.11 |
| 2011/0012406 A1* | 1/2011 | Gibson | ................. | B60N 2/2851 297/250.1 |

FOREIGN PATENT DOCUMENTS

| | | |
|---|---|---|
| CN | 103072497 A | 5/2013 |
| CN | 103879316 A | 6/2014 |
| DE | 19952777 C1 | 12/2000 |
| DE | 202012102471 U1 | 9/2012 |
| EP | 2275303 A1 | 1/2011 |
| EP | 2570299 A1 | 3/2013 |

OTHER PUBLICATIONS

Chapter I International Preliminary Report on Patentability of corresponding application No. PCT/EP2014/001859, dated Jan. 28, 2016, all enclosed pages cited.
First Office Action of corresponding Chinese application No. 201480040381.4 dated Oct. 17, 2016, all enclosed pages cited.
First Office Action of corresponding Korean application No. 10-2016-7001237 dated Jun. 15, 2017, all enclosed pages cited.
Second Office Action of corresponding Chinese application No. 201480040381.4 dated May 4, 2017, all enclosed pages cited.

* cited by examiner

CHILD SAFETY SEAT

TECHNICAL FIELD

The present invention relates to a child safety seat and, more particularly, to a child safety seat for use in a vehicle, the child safety seat being designed to increase the level of protection provided to a child seated in the child safety seat. The child safety seat is designed to offer improved protection in various crash configurations, in particular in crash configurations involving a side impact.

BACKGROUND

Many conventional child safety seats are designed to provide optimized protection in frontal crash configurations. About 25% of all crashes, however, occur from the side. Injuries received in side impact crashes are generally more severe than those typically received in front crashes. It is estimated that up to 30% of all fatalities are a result of side impact crashes. As a result, there is a great need for effective and reliable side impact protection in child safety seats.

Previous attempts at improving the side impact protection of child safety seats suffer from various drawbacks. In one attempt cushion elements have been attached to the interior of the head rest of a child safety seat. This results in improved protection of the head of a child only. The protection of other parts of the child's body, such as the child's torso, is not improved by these cushion elements. In another attempt, large damping components have been attached to the exterior of a child safety seat. While these damping components may significantly improve the side impact protection of the respective child safety seat, they increase the overall dimensions of the child safety seat. In many situations, for example in small vehicles, this might turn out to be a problem. In yet another attempt, adjustable protective elements have been added to a child safety seat whose configuration can be adapted to various factors. To achieve optimal side impact protection it has to be ensured that the adjustable protective elements of these child safety seats are always correctly configured which is not a trivial task.

As a result, most of the previous attempts at improving the side impact protection of child safety seats are associated with disadvantages such as shortcomings with respect to their ease of use. In addition, in many of these child safety seats the resulting protective effect of the child safety seat in a side crash is unsatisfactory and insufficient.

SUMMARY

Therefore, it is an object of the present invention to provide a child safety seat which offers improved side impact protection to a child sitting in the child safety seat.

This object is solved by the child safety seat with the features of claim 1. Advantageous embodiments of the present invention are indicated in dependent claims 2-18.

The child safety seat for a vehicle in accordance with the invention comprises an outer shell enclosing a seating area for a child and a protective element. The protective element comprises a housing component and an impact component, wherein the housing component is embedded into the outer shell and the impact component is mounted to the housing component, is configured to be enclosed at least partially by the housing component, and is configured to protrude laterally from the outer shell in a direction facing away from the seating area.

By embedding the housing component of the protective element into the outer shell of the child safety seat the space required by the protective element can be minimized. Preferably, the housing component does not protrude from the outer shell. When the housing component is embedded into the outer shell and the impact component is mounted to the housing component and is enclosed at least partially by the housing component, the impact component is also at least partially embedded or sunk into the outer shell and therefore does not protrude fully from the outer shell. As a result, an impact component of a given size which would require a certain amount of space if mounted directly to the outer shell, requires less space when mounted to the housing component as specified in claim 1.

In the child safety seat of the invention, the housing component or the impact component preferably comprises a deformable region adapted to cushion forces impacting on the impact component.

Such a deformable region allows the housing component or the impact component to be deformed by a force acting on the impact component. When the deformable region is being deformed, impact energy will be absorbed and therefore, during a side crash of the vehicle carrying the child safety seat of the invention, the impact on the child safety seat will be cushioned. Preferably, the deformable region is configured to be deformed plastically or elastically. If the deformable region is configured to be deformed plastically, impact energy will be converted into heat when the deformable region is being deformed. If the deformable region is configured to be deformed elastically, impact energy will be converted into potential energy which is temporarily stored in the deformed deformable region and will eventually be converted back into kinetic energy as the deformed deformable region returns to its original shape. Advantageously, the housing component comprises a first deformable region and the impact component comprises a second deformable region. By adjusting the properties of the second deformable region to the properties of the first deformable region the cushioning effect of the protective element can be maximized.

Advantageously, the deformable region of the impact component of the protective element of the child safety seat of the invention comprises a plurality of zones of varying compressibility. This allows the cushioning effect of the protective element to be adjusted to various factors, such as the distance between the child safety seat and an adjacent door of the vehicle.

The housing component of the protective element of the child safety seat of the invention preferably comprises a compressible side wall. Impact energy can then be absorbed by compression of the compressible side wall. The compressible side wall has a double function: on the one hand, as a structural component of the housing component to which the impact component is mounted, it allows the impact component to be mounted to the outer shell of the child safety seat. On the other hand, since it is compressible, it allows impact energy to be absorbed by the protective element. Advantageously, the housing component comprises a harmonica type side wall.

The compressible side wall of the housing component of the protective element of the child safety seat of the invention preferably comprises apertures. Providing the compressible side wall with apertures is a convenient way of making the compressible side wall compressible. Furthermore, by providing the compressible side wall of the housing component with apertures the weight of the housing component can be reduced.

In the child safety seat of the invention, the housing component is preferably supported by a fixed bearing. This fixed bearing allows impact forces to be guided into a structurally stable part of the child safety seat.

The impact component of the protective element of the child safety seat of the invention is preferably configured to be transferred between a rest position and a functioning position. Then the impact component can be disposed either in the functioning position or in the rest position. Consequently, the protective element can adopt two distinct configurations: a first configuration with the impact component disposed in the rest position and a second configuration with the impact component disposed in the functioning position. Providing two distinct configurations for the protective element makes it easier to adapt the protective effect of the protective element to specific needs and to reduce the space required by the protective element.

In the child safety seat of the invention, the impact component of the protective element is preferably configured to protrude further from the outer shell when disposed in the functioning position than when disposed in the rest position. Preferably, the impact component is configured not to protrude from the outer shell when disposed in the rest position. As a result, when the impact component is disposed in the functioning position the protective effect of the protective element will be maximized. In addition, when the impact component is disposed in the rest position the space required by the protective element may be minimized. Therefore, in a child safety seat in accordance with the invention which comprises more than one protective element, it might be advantageous to transfer only some of these protective elements to the functioning position while keeping the remaining protective elements in the rest position. In particular, it might be advantageous to dispose those protective elements in the functioning position that face a nearby door of the vehicle carrying the child safety seat and to dispose the protective elements facing away from this door in the rest position. In this way, the side of the child safety seat facing the door will be optimally cushioned whereas the amount of space required by the opposite side of the child safety seat can be kept small. If for some reasons it is desirable to cushion both sides of the child safety seat, for example in order to protect a passenger sitting on the seat next to the child safety seat, the impact components of the protective elements on both sides of the child safety seat should be disposed in the functioning position.

The impact component and the housing component of the protective element of the child safety seat of the invention are preferably configured to achieve cushioning of forces impacting on the impact component by transferring the impact component from the functioning position towards the rest position. This cushioning of forces might be achieved by providing for friction as the impact component is transferred from the functioning position towards the rest position. Then during the transfer of the impact component from the functioning position towards the rest position impact energy will be converted into heat.

In the child safety seat of the invention, the impact component of the protective element is preferably configured to protrude permanently from the outer shell. By having the impact component protrude permanently from the outer shell, the design of the protective element can be simplified. Furthermore, misuse can be avoided since an impact component protruding permanently from the outer shell will always be ready to cushion impact forces.

The outer shell of the child safety seat of the invention preferably comprises a side wing and the housing component is preferably embedded into the side wing. The side wing itself provides for improved side impact protection by shielding a child sitting in the child safety seat from lateral impacts. This protective effect is enhanced by the protective element whose housing component is embedded into the side wing. When the housing component of the protective element is embedded into the side wing, forces acting laterally on the side wing can be cushioned by the protective element. As a result, the side impact forces reaching the child will be reduced.

The outer shell of the child safety seat of the invention preferably comprises a base portion and the housing component is preferably embedded into the base portion. By embedding the housing component into the base portion of the child safety seat, the protective element can be provided in a low position on the child safety seat, near the hip area of a child sitting in the child safety seat. Impact forces transferred from the protective element to the child safety seat and from the child safety seat to the child can then be easily guided towards the hip area of the child. This is advantageous since the forces will then be guided to a robust part of the child's body.

The child safety seat of the invention preferably comprises a plurality of protective elements. Advantageously, protective elements are mounted to both sides of the child safety seat. Preferably, at least two protective elements are mounted to each side of the child safety seat with, on each side, at least one protective element positioned in the upper half of the child safety seat and another protective element positioned in the lower half of the child safety seat. Advantageously, a protective element positioned in the upper half of the child safety seat is mounted to a side wing of the child safety seat and a protective element positioned in the lower half of the child safety seat is mounted to a base portion of the child safety seat.

In the child safety seat of the invention, the housing component of the protective element is preferably integrally formed with the outer shell. In this way, the production process of the child safety seat of the invention can be simplified. Furthermore, the weight of the child safety seat can be reduced and the structural complexity of the child safety seat can be minimized.

The impact component of the protective element of the child safety seat of the invention preferably comprises a rigid body molded from a thermoplastic material. By molding the rigid body from a thermoplastic material the weight and the production costs of the impact component can be kept low. Furthermore, the rigid body can be conveniently configured to resist high impact forces without being damaged.

Preferably, the rigid body of the impact component of the protective element of the child safety seat of the invention comprises a screw thread. This screw thread allows a rotational movement of the impact component to be transferred to a linear movement. Advantageously, the screw thread is configured to allow the impact component to be transferred between the rest position and the functioning position by rotating the impact component. The impact component can then be easily transferred between the rest position and the functioning position without application of high forces.

In the child safety seat of the invention, the housing component of the protective element preferably comprises a flange configured to rest on the outer shell. With this flange the housing component can be firmly mounted to the outer shell of the child safety seat. Impact forces acting on the impact component which are transferred from the impact component to the housing component can then be safely and reliably guided into the outer shell of the child safety seat.

BRIEF DESCRIPTION OF THE SEVERAL
VIEWS OF THE DRAWING(S)

Specific embodiments of the invention will now be described by way of example and with reference to the accompanying drawings, in which:

FIG. 1b is a side view of the child safety seat of FIG. 1a;

DETAILED DESCRIPTION OF THE INVENTION

Figure 1A:
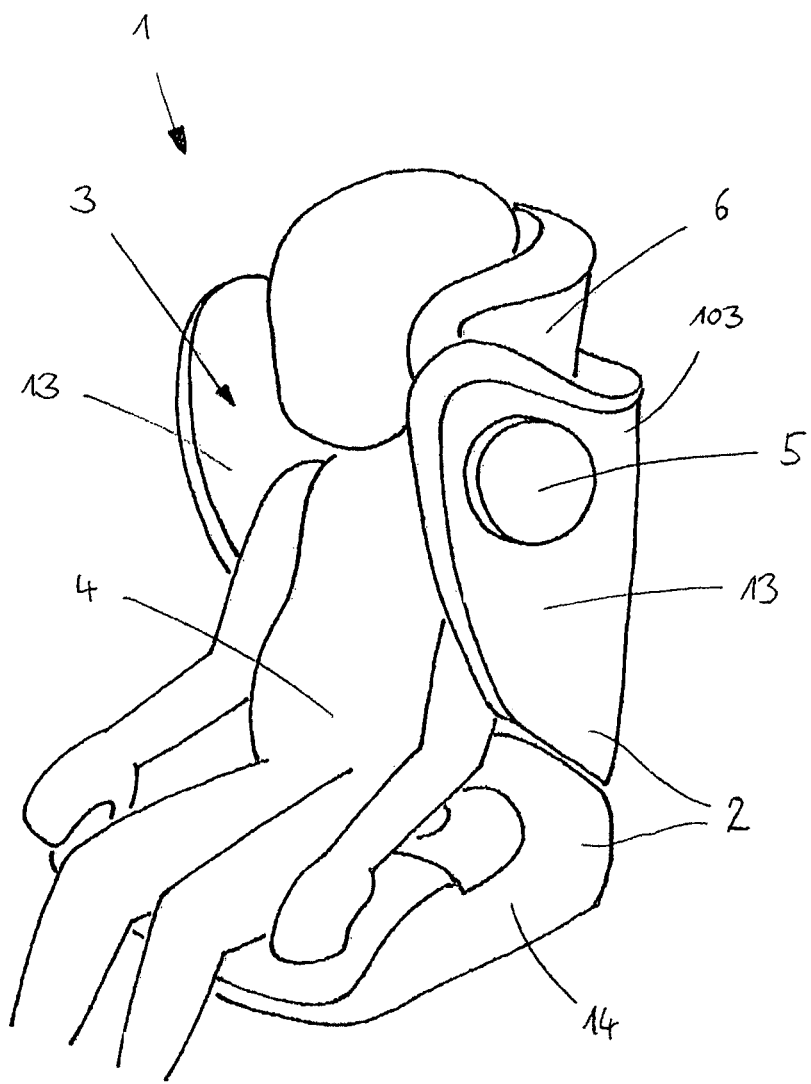
FIG. 1a is a perspective view of a child safety seat in accordance with a first embodiment of the invention with a child seated in the child safety seat.

FIG. 1 a shows a child safety seat 1 for transporting a child 4 in a vehicle in accordance with a first embodiment of the invention. The child safety seat 1 comprises an outer shell 2 which encloses a seating area 3 for a child 4. The outer shell 2 comprises a back rest 103 which comprises side wings 13. The outer shell 2 furthermore comprises a base portion 14. In addition, the child safety seat 1 comprises a head rest 6 which is mounted to the back rest 103. The child 4 sits on the base portion 14 and leans against the back rest 103 with the child's 4 head positioned on the head rest 6. The side wings 13 are configured to enclose the child's 4 torso on both sides. The child safety seat 1 furthermore comprises two protective elements 5 which are mounted to the side wings 13. In FIG. 1 a only the protective element 5 mounted to the left side wing 13 is visible since the protective element 5 mounted to the right side wing 13 is hidden by the right side wing 13. The protective elements 5 are attached to the upper half of the side wings 13 and are positioned in the vicinity of the child's 4 head and shoulders. The protective elements 5 protrude laterally from the side wings 13 and, since the side wings 13 are part of the outer shell 2, from the outer shell 2.

Conventionally, for transporting a child in a vehicle a child safety seat is mounted to one of the seats of the vehicle. Therefore, when installed in a vehicle, a child safety seat is usually positioned in close proximity to one of the doors of the vehicle. In case of a side crash of a vehicle carrying a child safety seat, the child safety seat will therefore usually impact on one of the doors of the vehicle. If this impact is severe, the child sitting in the child safety seat may get injured.

Since in the child safety seat 1 of the invention the protective elements 5 protrude laterally from the outer shell 2, in case of a side crash of the vehicle carrying the child safety seat 1 the protective element 5 facing the nearby door of the vehicle will be the first component of the child safety seat 1 that hits the vehicle. Therefore, the protective elements 5 may be used to control the dynamics of the impact of the child safety seat 1 on the vehicle at a very early stage.

Figure 1B:
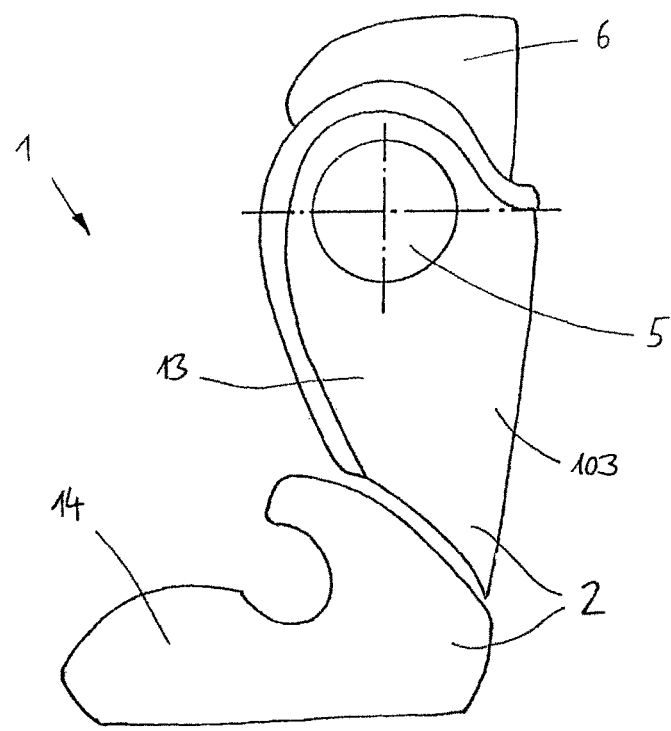

FIG. 1b shows a side view of the child safety seat of FIG. 1a. This view shows that the protective element 5 covers a large part of the side wing 13. Therefore, forces impacting on the protective element 5 which are transferred from the protective element 5 to the side wing 13 are distributed over a large area of the side wing 13. As a result, the occurrence of high peak forces acting on the side wing 13 can be avoided. This is advantageous since such high peak forces might damage the side wing 13 and result in severe injuries of the child 4.

Figure 2:
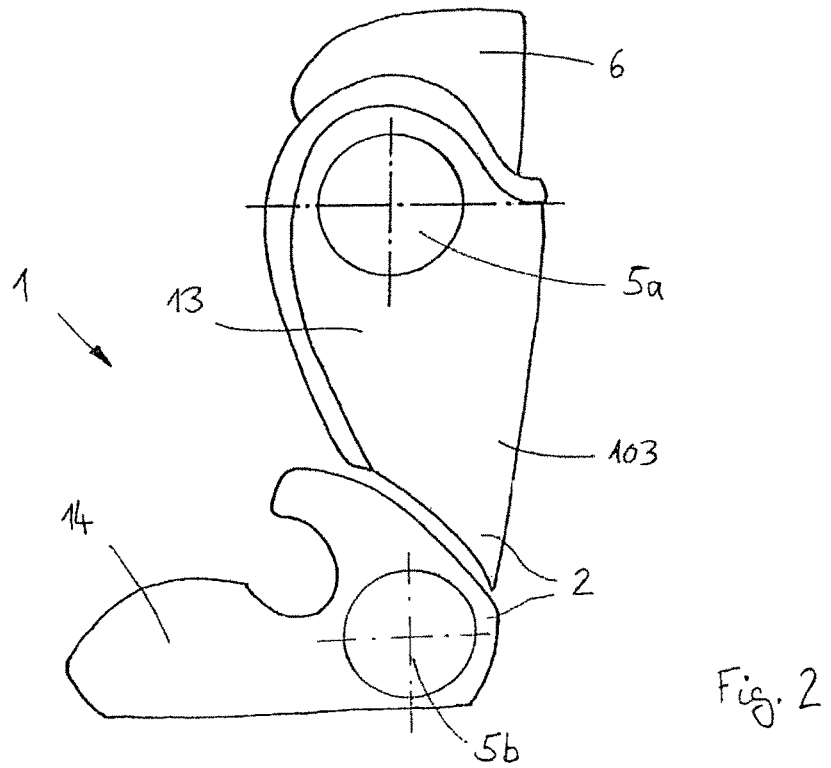
FIG. 2 is a side view of a child safety seat in accordance with a second embodiment of the invention.

FIG. 2 shows a side view of a child safety seat 1 in accordance with a second embodiment of the invention. This child safety seat 1 differs from the child safety seat of FIGS. 1a and 1b in that it comprises two protective elements on each side of the child safety seat. In particular, as shown in FIG. 2, the child safety seat 1 comprises a first protective element 5a which is mounted to the side wing 13 and a second protective element 5b which is mounted to the base portion 14. FIG. 2 only shows the left side of the child safety seat 1, therefore only two protective elements are visible. Two additional protective elements, which are not visible in FIG. 2, are attached to the right side of the child safety seat 1. By providing two protective elements on each side of the child safety seat 1 the potential area of contact between the child safety seat 1 and the vehicle can be increased. The first protective element 5a and the second protective element 5b constitute two load paths to guide impact forces to the outer shell 2 during a side crash. By providing two load paths the distribution of impact forces across the outer shell 2 can be improved.

The protective elements 5 of the child safety seat 1 of FIGS. 1a and 1b and the protective elements 5a and 5b of the child safety seat 1 of FIG. 2 are preferably configured to be transferred between a rest position and a functioning position. Advantageously, the protective elements are configured to protrude further from the outer shell of the child safety seat when disposed in the functioning position than when disposed in the rest position. The protective elements 5, 5a, 5b might be configured to protrude permanently from the outer shell 2 of the child safety seat 1.

Figure 3:
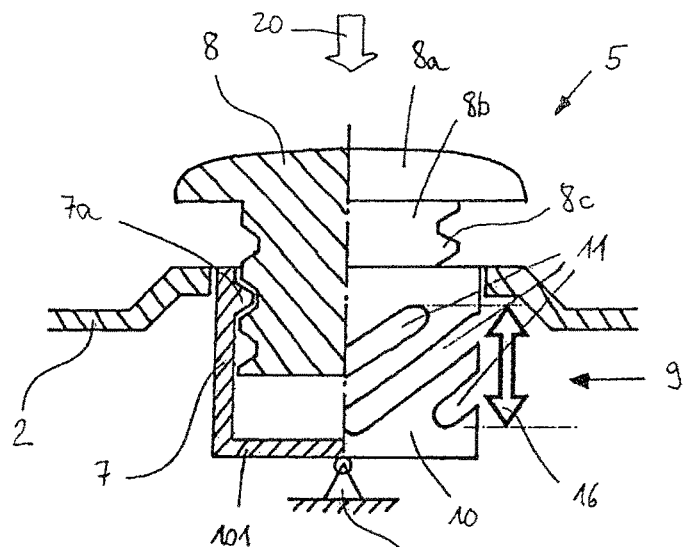
FIG. 3 is a detail of a child safety seat in accordance with another embodiment of the invention.

FIG. 3 is a partial sectional view of a protective element 5 of a child safety seat in accordance with a preferred embodiment of the invention. FIG. 3 shows a section of the outer shell 2 of a child safety seat comprising a protective element 5. Protective element 5 comprises a housing component 7 and an impact component 8. The housing component 7 is embedded into the outer shell 2 of the child safety seat. In particular, the outer shell 2 comprises an opening which is configured to receive the housing component 7. The housing component 7 is cup-shaped and comprises a compressible side wall 10 and a bottom area 101. Preferably, the bottom area 101 is circular. The compressible side wall 10 comprises a plurality of apertures 11. In the embodiment of FIG. 3, the apertures 11 are oval holes. The apertures 11 are shaped and arranged to allow the housing component 7 to be compressed and to extend in the directions indicated by arrow 16. The compressible side wall 10 of the housing component 7 constitutes a deformable region 9. The bottom area 101 of the housing component 7 is supported by a fixed bearing 12. The housing component furthermore comprises an internal thread 7a.

The impact component 8 comprises a top portion 8a and a bottom portion 8b. The top portion 8a is mounted on top of the bottom portion 8b. As shown in FIG. 3, the top portion 8a is wider in diameter than the bottom portion 8b. Preferably, the top portion 8a is integrally molded with the bottom portion 8b. The bottom portion 8b is essentially cylindrical and comprises an external thread 8c. The external thread 8c of the impact component 8 is configured to work together with the internal thread 7a of the housing component to build a screw thread. With this screw thread the impact component 8 can be extended from the housing component 7 by rotating the impact component 8 in a first direction and can be retracted into the housing component 7 by rotating the impact component 8 in a second direction opposite to the first direction. Preferably, the first direction is counterclockwise, whereas the second direction is clockwise.

When the impact component 8 is retracted completely into the housing component 7, the outer edge of the top portion 8a rests on the outer shell 2. In this rest position of the impact component 8 a force acting on the impact component 8 in the direction indicated by arrow 20 cannot push the impact component further into the outer shell 2. When, starting from the rest position, the impact component 8 is rotated in the first direction, the impact component 8 will be gradually extracted from the housing component 7. Preferably, the protective element 5 comprises a stop unit which prevents the impact component 8 from being extracted completely from the housing component 7. Advantageously, the stop unit is provided on the impact component 8. The stop unit defines a position of the impact component 8 in which the impact component 8 protrudes maximally from the housing component 7. This position is also referred to as functioning position. In the embodiment of FIG. 3 the impact component 8 can adopt a continuum of intermediate positions between the rest position (fully retracted) and the functioning position (fully extended). FIG. 3 shows one of these intermediate positions.

When the impact component 8 is disposed in the functioning position (or in the intermediate position of FIG. 3), a force acting on the impact component 8 in the direction indicated by arrow 20 will be transferred from the top portion 8a of the impact component 8 via the bottom portion 8b and the external thread 8c to the internal thread 7a of the housing component 7. Since the internal thread 7a is positioned near the top edge of the compressible side wall 10 of the housing component 7, the force will then be transferred from the internal thread 7a to the compressible side wall 10. From the compressible side wall 10 the force will finally be transferred into the fixed bearing 12 via the bottom area 101. Since the compressible side wall 10 is compressible, this flow of forces will result in a compression of the compressible side wall 10 of the housing component 7. Consequently, the impact component 8 will be pushed into the outer shell 2 of the child safety seat. As a result, when the impact component 8 is disposed in the functioning position, a force impacting on the impact position 8 can push the impact component 8 into the outer shell 2. During this process, compressing the compressible side wall 10 will absorb impact energy and therefore the impact on the child safety seat will be cushioned.

Depending on the dimensions and design of the impact component 8 and the housing component 7 the impact component 8 can be pushed into the outer shell 2 until the top portion 8a of the impact component 8 contacts the outer shell 2, or until the bottom portion 8b of the impact component 8 hits the bottom area 101 of the housing component 7, or until the compressible side wall 10 of the housing component 7 is completely compressed. In the first case a force impacting on the impact component 8 will finally be transferred to the child safety seat via the outer shell 2, whereas in the second and third case the force will finally be transferred to the child safety seat via the fixed bearing 12.

Figure 4A:
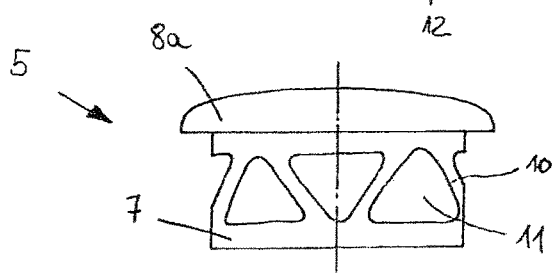
FIG. 4a is a side view of a protective element of a child safety seat in accordance with another embodiment of the invention.
Figure 4B:
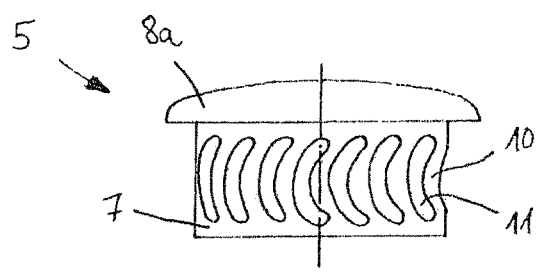
FIG. 4b is a side view of a protective element of a child safety seat in accordance with another embodiment of the invention.
Figure 4C:
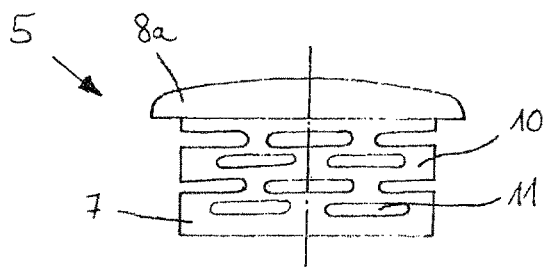
FIG. 4c is a side view of a protective element of a child safety seat in accordance with another embodiment of the invention.
Figure 4D:
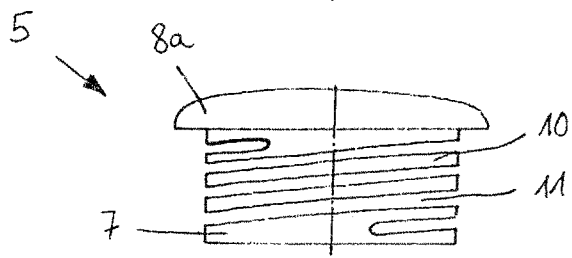
FIG. 4d is a side view of a protective element of a child safety seat in accordance with another embodiment of the invention.

FIGS. 4a-d show additional variants of protective elements 5 in accordance with further embodiments of the invention. In the embodiment of FIG. 4a the housing component 7 of the protective element 5 comprises a plurality of triangular apertures 11. In the embodiment of FIG. 4b the housing component 7 of the protective element 5 comprises a plurality of curved apertures 11. In the embodiment of FIG. 4c the housing component 7 of the protective element 5 comprises a plurality of oval apertures 11. The oval apertures 11 are arranged in a regular pattern. In the embodiment of FIG. 4d the housing component 7 of the protective element 5 comprises one or more apertures 11 which spiral around the side wall of the housing component 7. In all four embodiments of FIGS. 4a-d the side wall 10 of the housing component 7 of the protective element 5 is made compressible by the provision of apertures 11.

Figure 5:
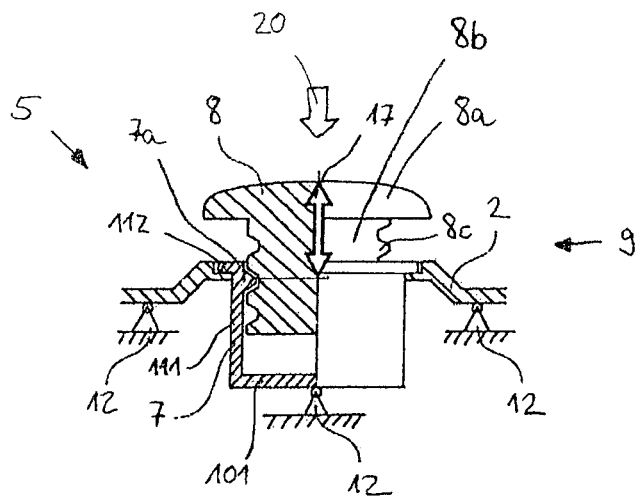
FIG. 5 is a detail of a child safety seat in accordance with another embodiment of the invention.

FIG. 5 shows a protective element 5 of a child safety seat in accordance with another embodiment of the invention. In this embodiment the side wall 111 of the housing component 7 of the protective element 5 is not compressible but rigid. Preferably, the side wall 111 of the housing component 7 does not comprise any apertures. The housing component 7 is again embedded into the outer shell 2 of the child safety seat. In this embodiment, however, the upper edge of the housing component 7 comprises a flange 112 which rests on the outer shell 2. Furthermore, in the vicinity of the opening in the outer shell 2 which receives the housing component 7 the outer shell 2 is supported by fixed bearings 12. The bottom area 101 of the housing component 7 is also supported by a fixed bearing 12.

The impact component 8 of the protective element 5 is mounted to the housing component 7 as described in the context of FIG. 3. In the embodiment of FIG. 5, however, the impact component 8 comprises a deformable region 9. The deformable region 9 allows the impact component 8 to be compressed and to expand again in the directions indicated by arrow 17. Preferably, the deformable region 9 comprises a foam-like structure comprising thermoplastics or alternative structural elements with damping characteristics. The thermoplastics preferably comprise crosslinked polyethylene (XPE), expanded polystyrene (EPS), expanded polypropylene (EPP), or expanded polyethylene (EPE). The deformable region 9 of the impact component 8 may also be implemented as described in the context of FIGS. 3 and 4a-d for the deformable region of the housing component, i.e. the impact component 8 may be made compressible by providing the impact component 8 with apertures. Preferably, the apertures are positioned in a side wall of the bottom portion 8b of the impact component 8.

The impact component 8 is preferably configured to be transferred between a functioning position and a rest position as described for the impact component 8 of FIG. 3. When the impact component 8 is disposed in the functioning position (or in the intermediate position of FIG. 5), a force acting on the impact component 8 in the direction indicated by arrow 20 will be transferred from the top portion 8a of the impact component 8 via the bottom portion 8b and the external thread 8c to the internal thread 7a of the housing component 7. From the internal thread 7a of the housing component 7 a first part of the force will be transferred to the outer shell 2 via the flange 112 of the housing component 7 and from the outer shell 2 to the fixed bearings 12 that support the outer shell 2. A second part of the force will be transferred from the internal thread 7a to the bottom area 101 of the housing component 7 via the side wall 111 of the housing component 7 and from the bottom area 101 to the fixed bearing 12 that supports the bottom area 101. This flow of forces will result in a compression of the deformable region 9 of the impact component 8. Compressing the deformable region 9 of the impact component 8 will absorb impact energy and therefore the impact on the child safety seat will be cushioned.

In a preferred embodiment of the invention, the deformable region 9 of the impact component 8 comprises a plurality of zones of varying compressibility. In particular, the impact component 8 may comprise a plurality of zones of varying compressibility with each zone exhibiting a constant compressibility and with the compressibility of each zone differing from the compressibility of the other zones. Generally, the compressibility of a zone correlates with the hardness or rigidity of this zone. A highly compressible zone will be softer than a zone which is less compressible. Advantageously, in the impact component 8 of the protective element 5 of FIG. 5, the zones of varying compressibility are stacked on top of each other. Therefore, the impact component 8 comprises a topmost compressible zone positioned at or near the top of the impact component 8, a bottommost compressible zone positioned at or near the bottom of the impact component 8, and a plurality of other compressible zones placed between the topmost compressible zone and the bottommost compressible zone. Advantageously, the compressibility of the compressible zones increases from top to bottom. Therefore, the topmost compressible zone is preferably more rigid, i.e. less compressible, than the rest of the compressible zones. In addition, the bottommost compressible zone is preferably softer, i.e. more compressible, than the rest of the compressible zones. The compressibility of the impact component 8 might increase from top to bottom stepwise or continually. Preferably, the compressibility of the impact component 8 increases exponentially. With such a compressibility profile of the impact component 8 of the protective element 5 the amount of energy which is absorbed when the impact component 8 is pushed into the outer shell 2 can be kept essentially constant regardless of how far the impact component 8 extends from the outer shell 2.

In the configuration of the protective element 5 shown in FIG. 5, for example, only a small fraction of the impact component 8 protrudes from the outer shell 2. When the impact component 8 is compressed by a force acting in the direction of arrow 20, only this small fraction of the impact component 8 will be compressed. Since the upper part of the impact component 8 is quite rigid (i.e. is hard to compress), however, compressing this part of the impact component 8 will require a high force. Therefore, although the impact component 8 does not have to be pushed far to bring the top portion 8a of the impact component 8 into contact with the outer shell 2, a high force will be required to push the impact component 8.

When the impact component 8 protrudes further from the outer shell 2 than shown in FIG. 5, a larger fraction of the impact component 8 will be compressed. The fraction of the impact component 8 protruding from the outer shell 2 will then comprise deformable zones which are softer (i.e. more compressible) than the compressible zones protruding from the outer shell 2 in the configuration of FIG. 5. Therefore, the force required to compress the impact component 8 will be smaller. Consequently, the impact component 8 will have to be pushed further to bring the top portion 8a of the impact component 8 into contact with the outer shell 2 than in FIG. 5. Since the force required to push in the impact component 8, however, is smaller than the force required in the configuration of FIG. 5, the work required to push in the impact component 8 might be similar in the two configurations.

Therefore, the amount of energy which is absorbed when the impact component 8 is pushed into the outer shell 2 is preferably independent of how far the impact component 8 originally protrudes form the outer shell 2. This is particularly advantageous, since in this way it can be ensured that the protective element is always configured to absorb impact energy in a side crash.

Figure 6:
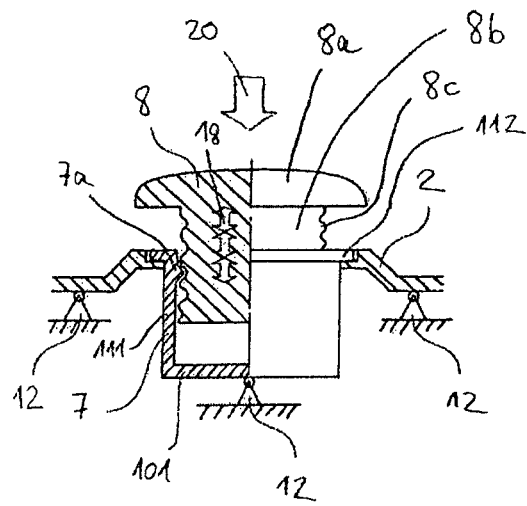
FIG. 6 is a detail of a child safety seat in accordance with another embodiment of the invention.

FIG. 6 shows a protective element 5 of a child safety seat in accordance with another embodiment of the invention. In many aspects, this embodiment is similar to the embodiment of FIG. 5. The side wall 111 of the housing component 7 of the protective element 5 is not compressible but rigid and the upper edge of the housing component 7 comprises a flange 112 which rests on the outer shell 2. The protective element 5 of FIG. 6 differs from the protective element 5 of FIG. 5 mainly in the way the impact component 8 is mounted to the housing component 7. In the embodiment of FIG. 6, the impact component 8 is configured to be pushed into the housing component by a force acting on the impact component 8 in the direction of arrow 20. Preferably, the external thread 8c of the impact component 8 and the internal thread 7a of the housing component 7 are designed to allow the ridges of the external thread 8c to be pushed past the ridges of the internal thread 7a. Therefore, when the impact component 8 is pushed into the housing component 7 the bottom portion 8b of the impact component 8 will be compressed laterally and expand again repeatedly. Laterally compressing the bottom portion 8b of the impact component 8 will absorb impact energy and therefore the impact on the child safety seat will be cushioned as the impact component 8 is pushed into the housing component 7. Generally, the impact component 8 will not be pushed into the housing component 7 at a constant speed but will be pushed in in steps instead. This stepwise movement is indicated by arrows 18 in FIG. 6.

Instead of an external thread 8c and an internal thread 7b the protective element 5 may comprise a catch mechanism to connect the impact component 8 to the housing component 7. This catch mechanism preferably allows the impact component 8 to be pushed into and to be pulled out of the housing component 7. Advantageously, the bottom portion 8b of the impact component 8 comprises a plurality of circular grooves instead of the external thread 8c. The housing component 7 preferably comprises a circular ridge instead of the internal thread 7a. The circular ridge is configured to mesh with the circular grooves of the impact component 8. Rotating the impact component 8 about its central axis will then not result in transfer of the impact component 8 between the rest position and the functioning position. Instead, to transfer the impact component 8 between the rest position and the functioning position the impact component 8 has to be pushed into the housing component 7 or be pulled out of the housing component 7. By providing the impact component 8 and the housing component 7 with a catch mechanism other than a screw thread, impact component 8 and housing component 7 no longer need to be circular in cross-section. The cross-section of the protective element 5 can then be freely designed. In particular, it is possible to adapt the shape of the protective element 5 to the shape of the child safety seat. For a protective element 5 attached to the base portion of a child safety seat, for instance, the shape of the protective element 5 could be adapted to the shape of the base portion and, for a protective element 5 attached to the side wing of a child safety seat, the shape of the protective element 5 could be adapted to the shape of the side wing.

Figure 7:
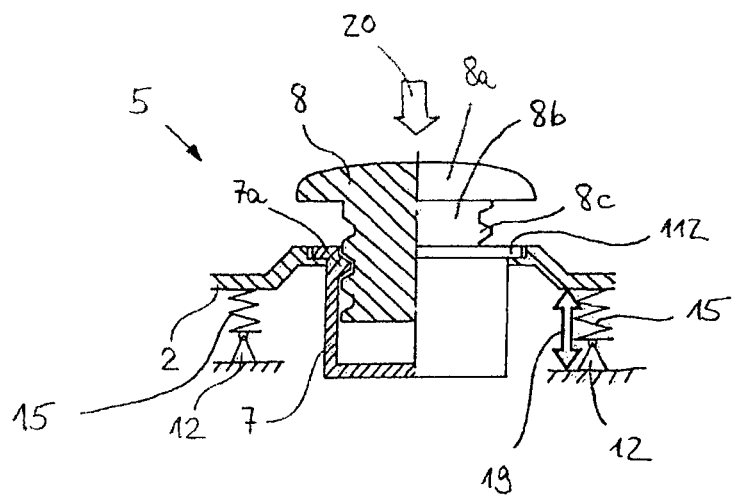
FIG. 7 is a detail of a child safety seat in accordance with another embodiment of the invention.

FIG. 7 shows a protective element 5 of a child safety seat in accordance with another embodiment of the invention. In this embodiment the upper edge of the housing component 7 again comprises a flange 112 which rests on the outer shell 2. The outer shell 2 is configured to be resilient or elastic in the vicinity of the protective element 5. As shown in FIG. 7, the child safety seat comprises elastic elements 15 which couple the outer shell 2 to fixed bearings 12. When the section of the outer shell 2 shown in FIG. 7 is pushed downwards towards the fixed bearings 12, the elastic elements 15 are being compressed. When the force on the outer shell 2 is reduced, the elastic elements 15 will push the outer shell 2 back towards its original position. This is indicated by arrow 19 in FIG. 7. As an alternative to the elastic elements 15, the outer shell 2 itself could be configured to exhibit a high degree of resilience. Then the outer shell 2 will by itself return to its original position after it has been pushed downwards.

In the embodiment of FIG. 7 a force acting on the impact component 8 in the direction of arrow 20 will be transferred from the top portion 8a of the impact component 8 to the bottom portion 8b of the impact component 8 and from the bottom portion 8b to the outer shell 2 via the external thread 8c, the internal thread 7a, and the flange 112. As a result, the impact component 8, the housing component 7, and the outer shell 2 will be pushed downwards, deforming the outer shell 2 and compressing the elastic elements 15. Deforming the outer shell 2 and compressing the elastic elements 15 will absorb impact energy and therefore the impact on the child safety seat will be cushioned. Since in this embodiment of the invention there is no flow of forces along the side wall and the bottom area of the housing component 7, side wall and bottom area might be omitted. The resulting housing component is preferably ring-shaped and is advantageously integrally formed with the outer shell 2.

Several aspects of the embodiments of the invention described in the context of FIGS. 3-7 might advantageously be combined in a single embodiment. In particular, in the protective elements of FIGS. 3, 6, and 7 the impact component 8 might advantageously comprise a deformable region as described for the impact component of FIG. 5. In the protective elements of FIGS. 3, 5, and 7 the screw thread comprising an external thread and an internal thread might be replaced by a catch mechanism as described for the protective element of FIG. 6. In the protective elements of FIGS. 3, 5, and 6 the outer shell might comprise a resilient region as described for the impact component of FIG. 7. The resulting protective element will be particularly suitable for cushioning impact forces acting on a child safety seat.

LIST OF REFERENCE NUMERALS

1 child safety seat
2 outer shell
3 seating area
4 child
5 protective element
5a first protective element
5b second protective element
6 head rest
7 housing component
7a internal thread
8 impact component
8a top portion of impact component
8b bottom portion of impact component
9 deformable region
10 compressible element
11 apertures
12 fixed bearing
13 side wing
14 base portion
15 elastic element
16 arrow
17 arrow
18 arrow
19 arrow
20 arrow
101 bottom area
103 back rest
111 side wall
112 flange

The invention claimed is:

1. A child safety seat for a vehicle comprising
   an outer shell enclosing a seating area for a child and
   a protective element, the protective element comprising
      a housing component and
      an impact component,
   wherein the housing component is embedded into the outer shell and the impact component is mounted to the housing component, is configured to be enclosed at least partially by the housing component, and is configured to protrude laterally from the outer shell in a direction facing away from the seating area.

2. The child safety seat of claim 1, wherein the housing component or the impact component comprises a deformable region adapted to cushion forces impacting on the impact component.

3. The child safety seat of claim 2, wherein the deformable region comprises a foam structure.

4. The child safety seat of claim 1, wherein the impact component comprises a deformable region adapted to cushion forces impacting on the impact component and wherein the deformable region comprises a plurality of zones of varying compressibility.

5. The child safety seat of claim 1, wherein the housing component comprises a compressible side wall.

6. The child safety seat of claim 5, wherein the compressible side wall comprises apertures.

7. The child safety seat of claim 1, wherein the housing component is supported by a fixed bearing.

8. The child safety seat of claim 1, wherein the impact component is configured to be transferred between a rest position and a functioning position.

9. The child safety seat of claim 8, wherein the impact component is configured to protrude further from the outer shell when disposed in the functioning position than when disposed in the rest position.

10. The child safety seat of claim 8, wherein the impact component and the housing component are configured to achieve cushioning of forces impacting on the impact component by transferring the impact component from the functioning position towards the rest position.

11. The child safety seat of claim 1, wherein the impact component is configured to protrude permanently from the outer shell.

12. The child safety seat of claim 1, wherein the outer shell comprises a side wing and the housing component is embedded into the side wing.

13. The child safety seat of claim 1, wherein the outer shell comprises a base portion and the housing component is embedded into the base portion.

14. The child safety seat of claim 1, wherein the housing component is integrally formed with the outer shell.

15. The child safety seat of claim 1, wherein the impact component comprises a rigid body molded from a thermoplastic material.

16. The child safety seat of claim 15, wherein the rigid body comprises a screw thread.

17. The child safety seat of claim 1, wherein the housing component comprises a flange configured to rest on the outer shell.

18. The child safety seat of claim 1, wherein at least two protective elements are mounted to each side of the child safety seat with, on each side, at least one protective element positioned in an upper half of the child safety seat and another protective element positioned in a lower half of the child safety seat.

* * * * *